United States Patent
Johnson et al.

(10) Patent No.: US 7,588,405 B2
(45) Date of Patent: Sep. 15, 2009

(54) INCLINE GRAIN CONVEYOR FOR GRAIN BINS

(75) Inventors: Eric Johnson, Aplington, IA (US); Kenneth Johnson, Aplington, IA (US); Clarence T. Sherfield, Ackley, IA (US)

(73) Assignee: Grainway, L.L.C., Aplington, LA (US)

( * ) Notice: Subject to any disclaimer, the term of this patent is extended or adjusted under 35 U.S.C. 154(b) by 348 days.

(21) Appl. No.: 11/035,221

(22) Filed: Jan. 13, 2005

(65) Prior Publication Data

US 2005/0158155 A1    Jul. 21, 2005

Related U.S. Application Data

(60) Provisional application No. 60/536,916, filed on Jan. 16, 2004, provisional application No. 60/547,947, filed on Feb. 26, 2004.

(51) Int. Cl.
*B65G 37/00* (2006.01)

(52) U.S. Cl. .................. 414/327; 414/306; 198/823

(58) Field of Classification Search ............. 414/304, 414/306, 326, 327; 39/491; 198/580, 311
See application file for complete search history.

(56) References Cited

U.S. PATENT DOCUMENTS

| | | |
|---|---|---|
| 3,198,353 A | 8/1965 | McDowell |
| 3,231,064 A | 1/1966 | Towels |
| 3,339,691 A | 9/1967 | Schlagel, Jr. |
| 3,782,528 A | 1/1974 | Burger |
| 3,797,707 A | 3/1974 | Jenike |
| 3,827,578 A | 8/1974 | Hough |
| 3,828,916 A | 8/1974 | Patz |
| 3,946,861 A | 3/1976 | Sandefur |
| 3,991,913 A | 11/1976 | Steffen |
| 4,230,222 A * | 10/1980 | Clark ..................... 198/580 |
| 4,265,443 A * | 5/1981 | Berthelot ................ 271/182 |
| 4,330,232 A | 5/1982 | McClaren |
| 4,396,337 A * | 8/1983 | Johanning ............... 414/304 |
| 4,512,687 A * | 4/1985 | Enns ..................... 406/41 |
| 5,050,718 A | 9/1991 | Orlosky |
| 5,052,545 A | 10/1991 | Gongen |
| 5,088,871 A | 2/1992 | Mellish |
| 5,098,247 A * | 3/1992 | Campbell ............... 414/326 |
| 5,293,986 A | 3/1994 | Mouritzen |
| 5,492,453 A | 2/1996 | Mouritzen |
| 5,498,119 A * | 3/1996 | Faivre ................... 414/528 |
| 5,551,167 A * | 9/1996 | van Fossen .............. 34/491 |

(Continued)

FOREIGN PATENT DOCUMENTS

JP        40 3003809 A        1/1991

(Continued)

*Primary Examiner*—Charles A Fox
(74) *Attorney, Agent, or Firm*—McKee, Voorhees & Sease, P.L.C.

(57) ABSTRACT

An apparatus and method for unloading grain bins. The apparatus (10) comprises an endless conveyor belt (18) supported on a set of rollers. A first section of the supported conveyor belt (18) is adapted for insertion at or near the bottom of a grain bin. A second section is adapted for extension out of the grain bin to an outlet. The conveyor belt (18) is supported in a manner that allows transport of the grain with a minimization of friction, trauma or interaction between the grain to maintain quality of the grain. The speed of the conveyor belt (18) is selected to make for efficient throughput of unloading. Other aspects of the invention include a structure to incline the output end of a conveyor belt (18), support the conveyor belt (18), adapt the conveyor to different sizes, and assist in movement of the conveyor, and ancillary parts to allow selective use of the conveyor relative to the bin.

24 Claims, 15 Drawing Sheets

U.S. PATENT DOCUMENTS

| | | | | |
|---|---|---|---|---|
| 5,702,221 A | * | 12/1997 | Sridhar | 414/142.3 |
| 6,048,153 A | | 4/2000 | Thompkins | |
| 6,068,103 A | * | 5/2000 | Werner | 198/311 |
| 6,085,439 A | * | 7/2000 | Skaarup | 34/225 |
| 6,269,943 B1 | * | 8/2001 | Mott | 198/823 |
| 6,360,878 B1 | | 3/2002 | Deal | |
| 6,360,879 B1 | * | 3/2002 | Crawford | 198/823 |
| 7,008,163 B2 | * | 3/2006 | Russell | 414/306 |
| 2002/0043448 A1 | * | 4/2002 | Peltier et al. | 198/618 |
| 2003/0071090 A1 | | 4/2003 | Johanson | |

FOREIGN PATENT DOCUMENTS

JP    41 1243878 A    9/1999

* cited by examiner

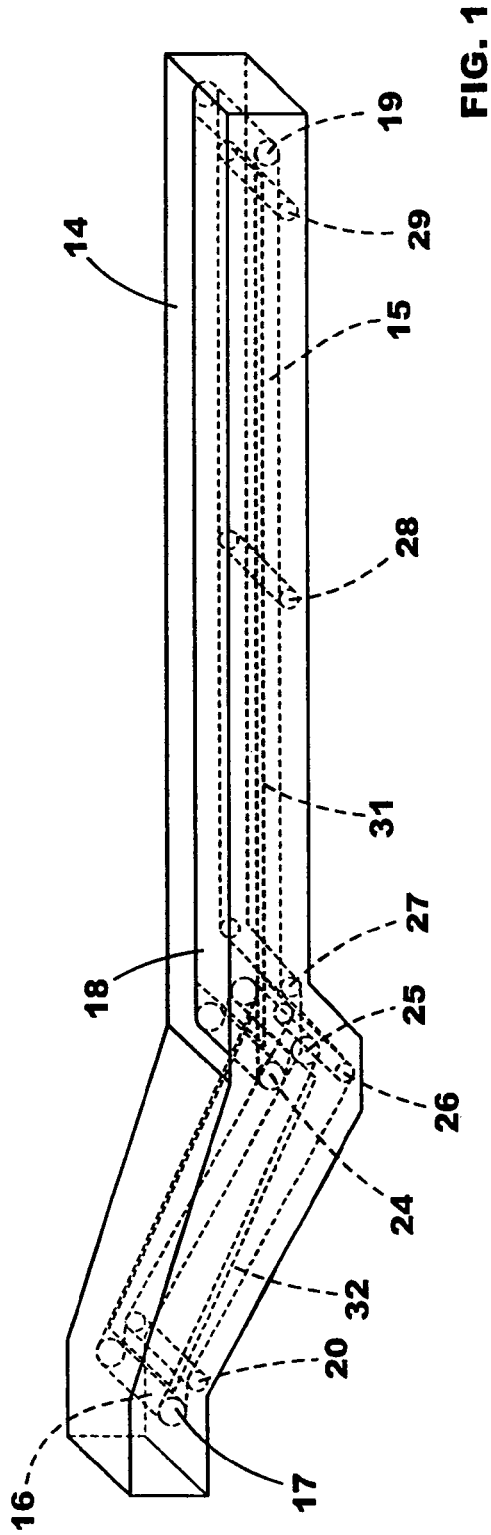
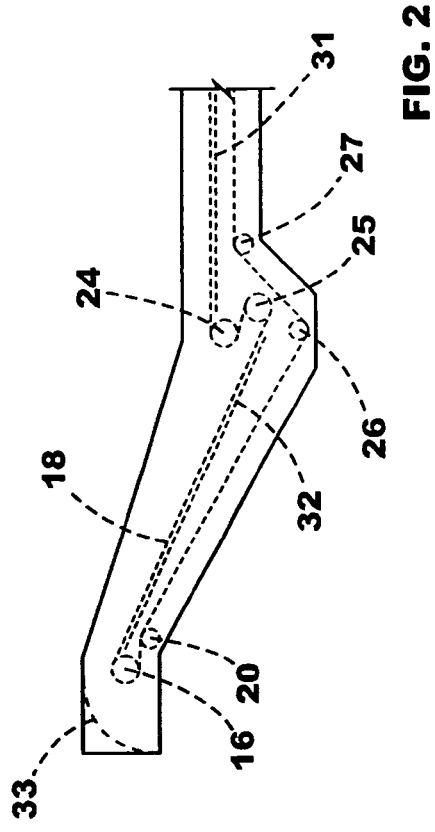

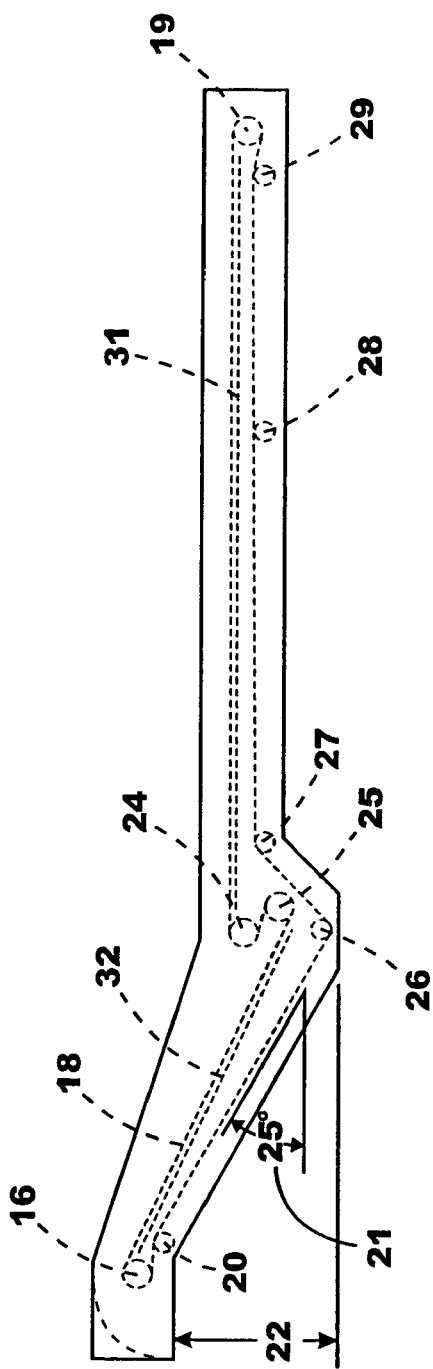
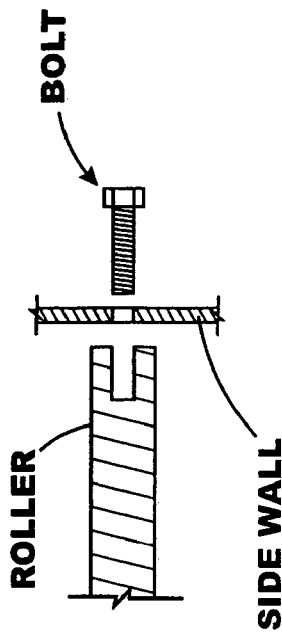
FIG. 3
FIG. 3A

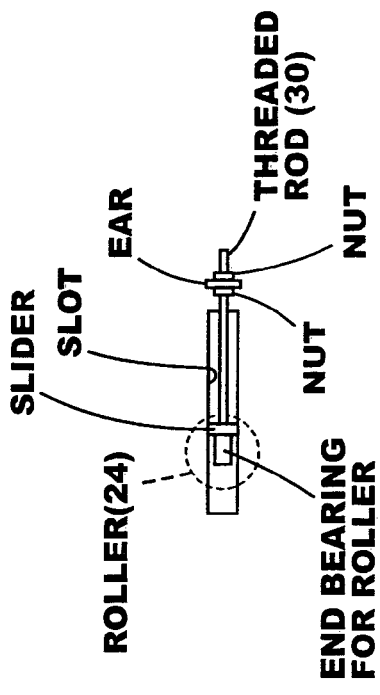
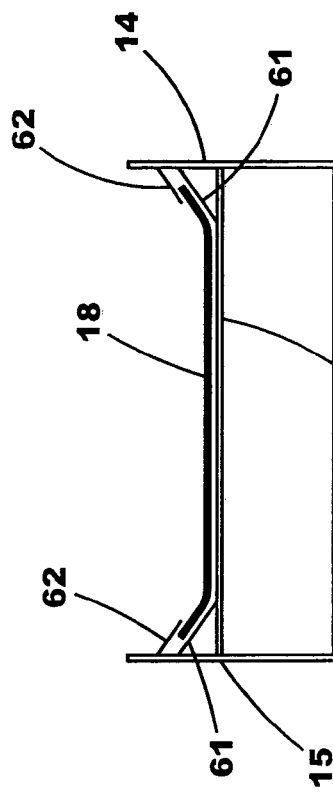
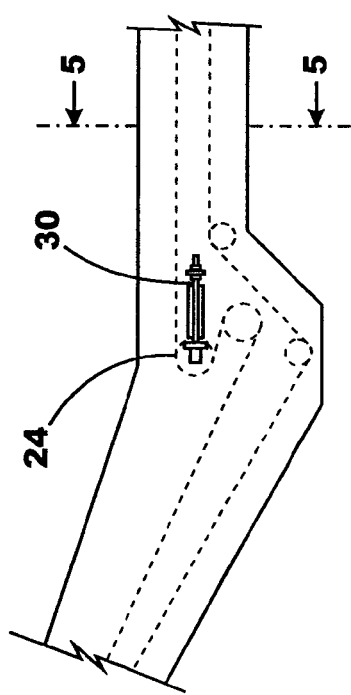

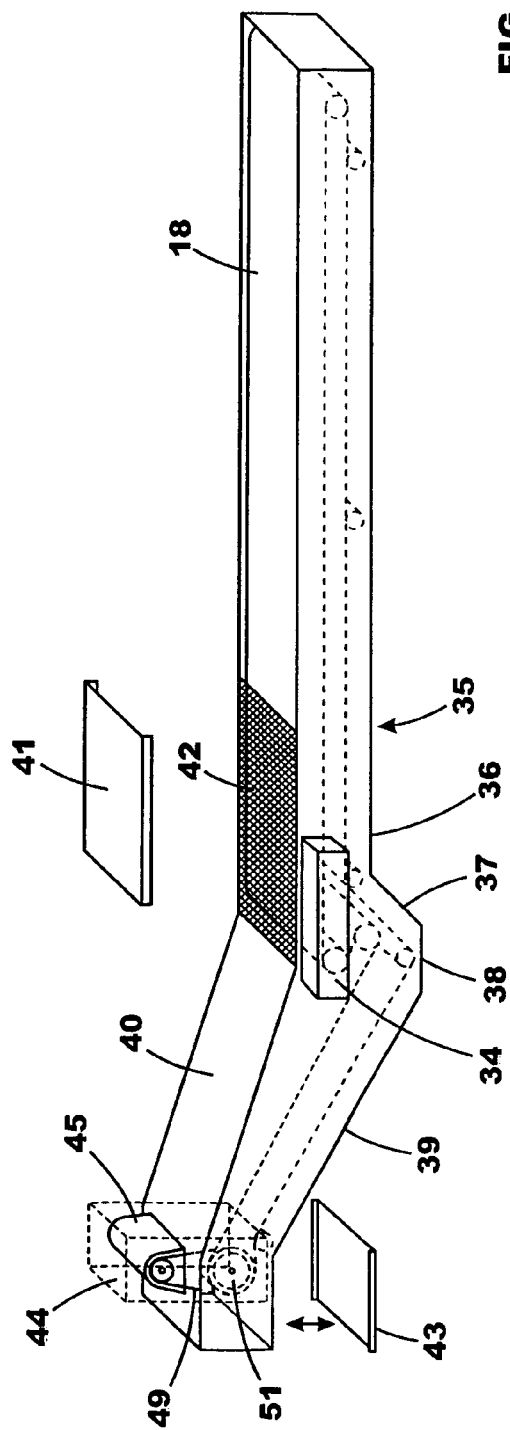
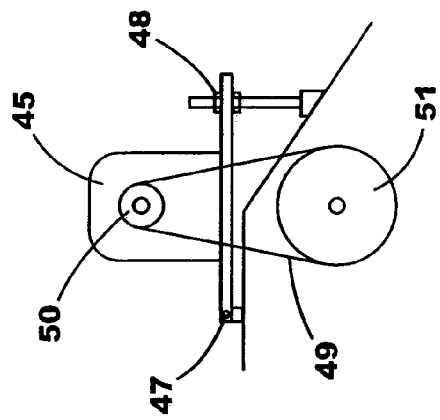
FIG. 6
FIG. 6A

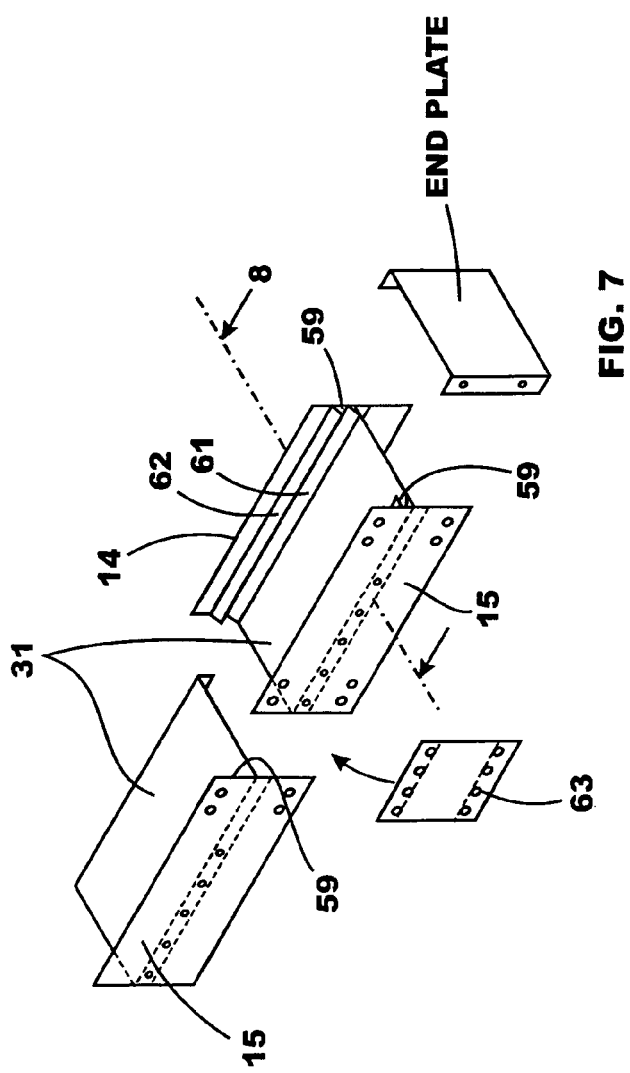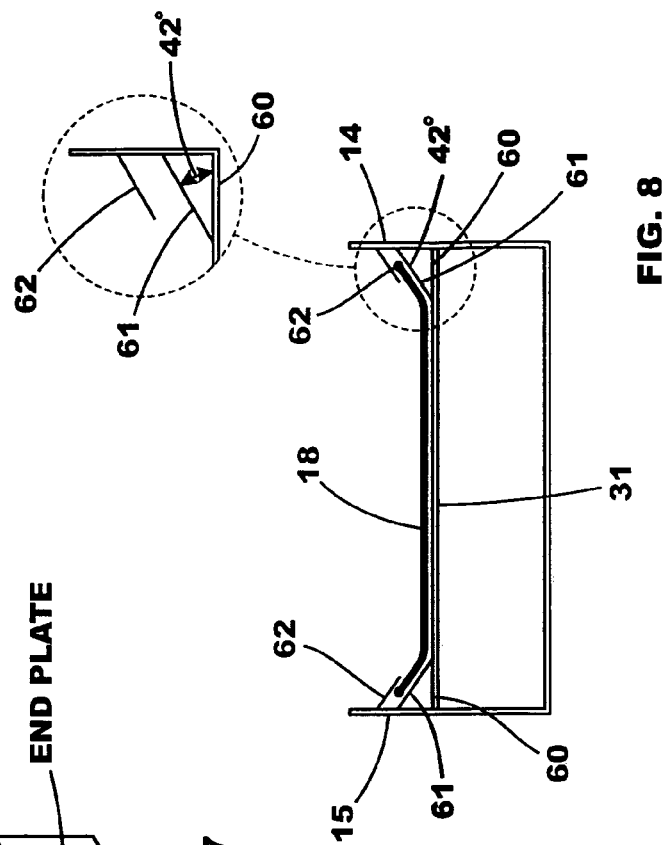

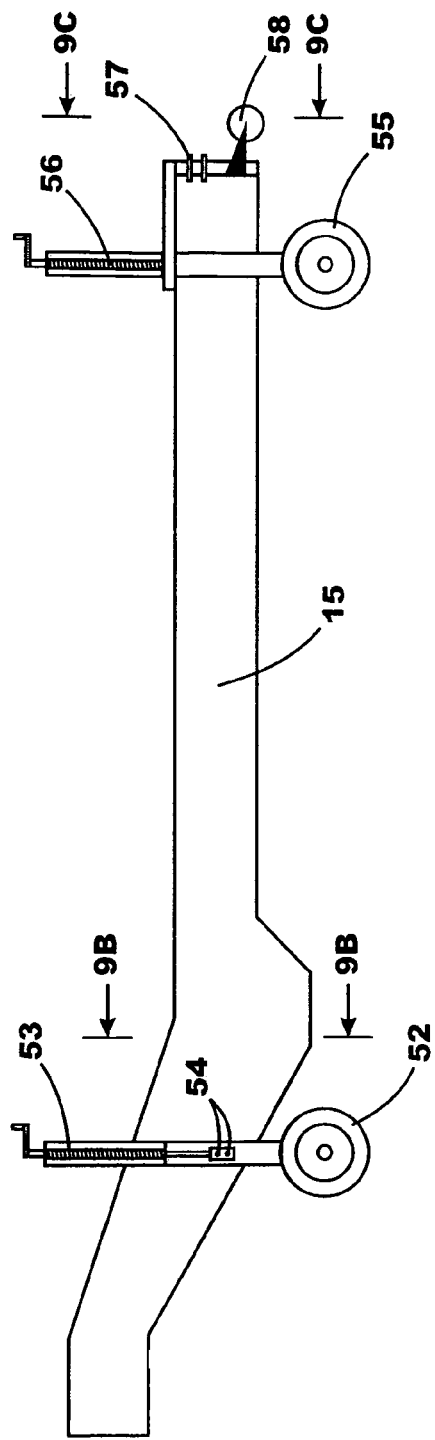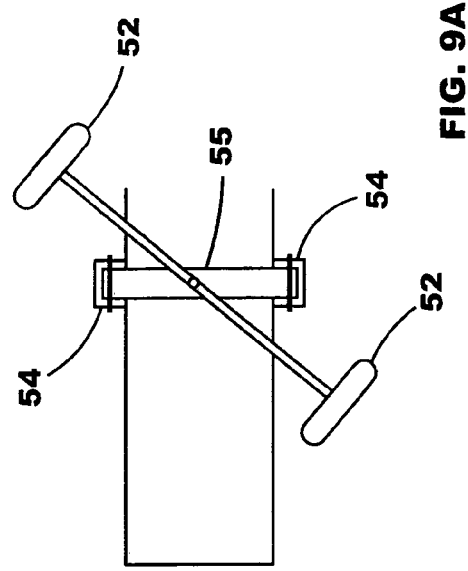
FIG. 9
FIG. 9A

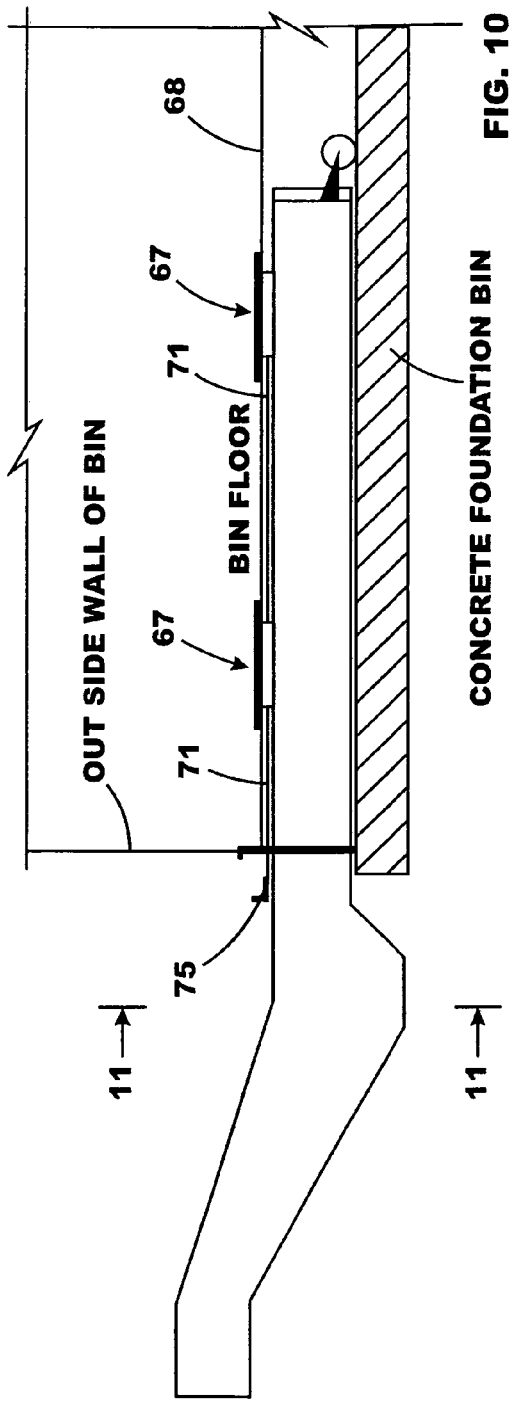
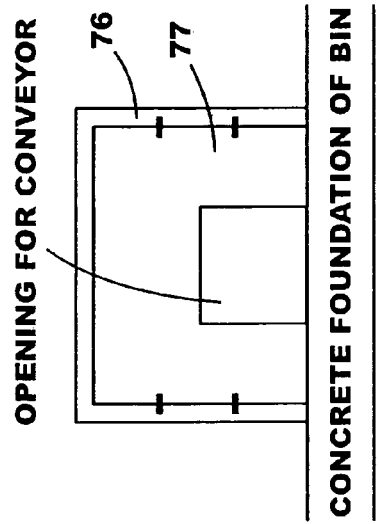

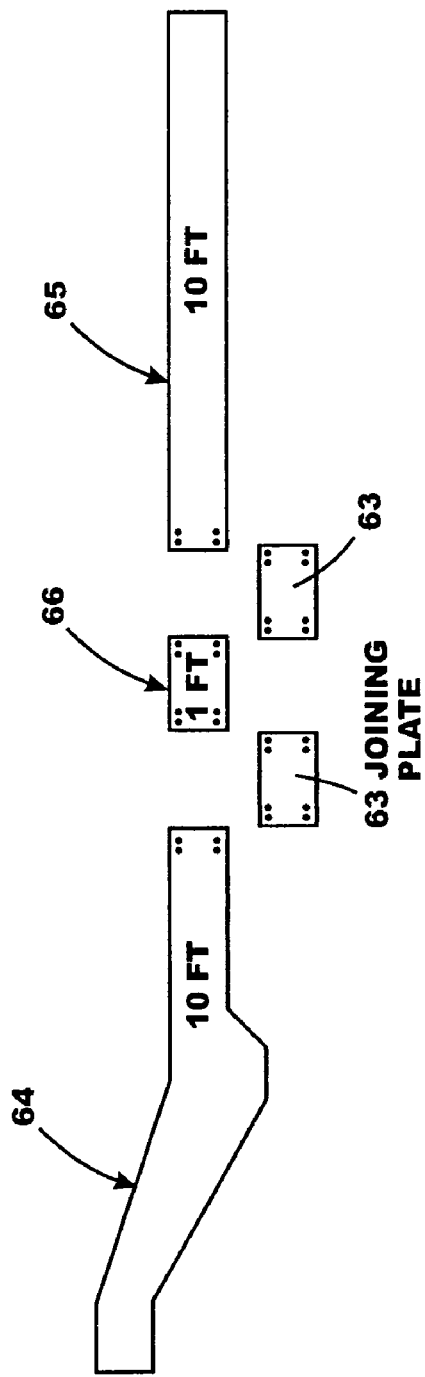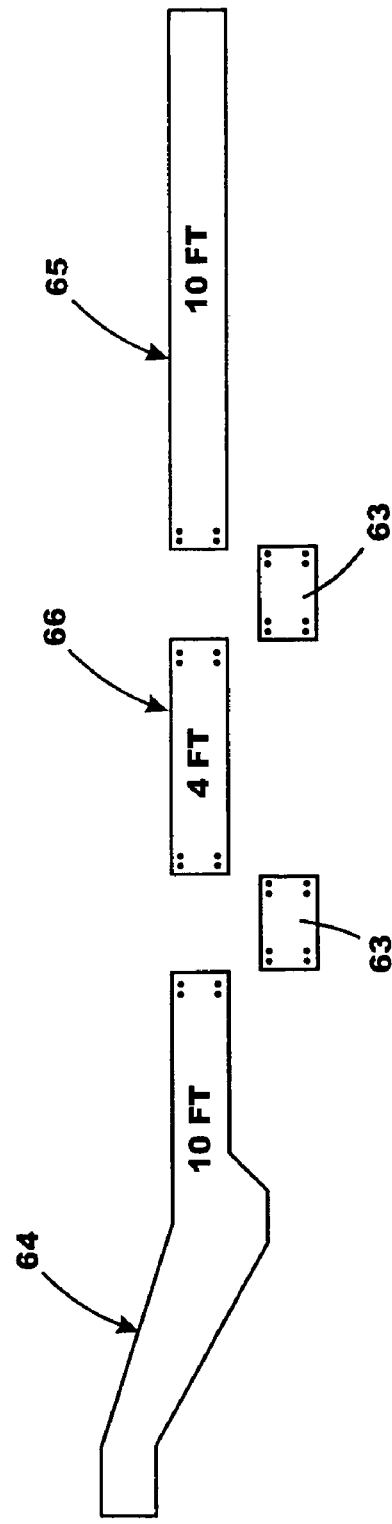

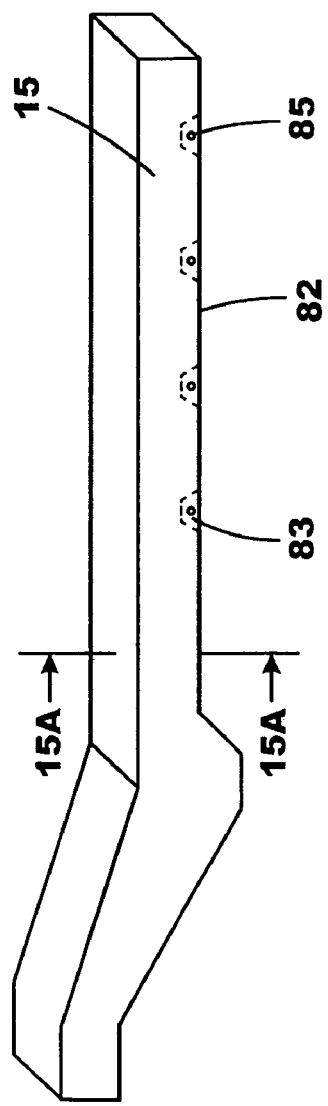
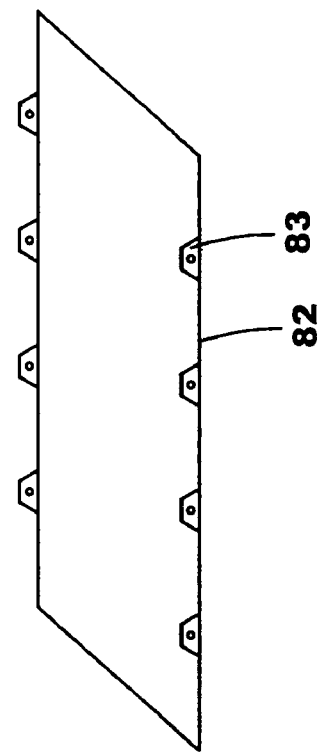
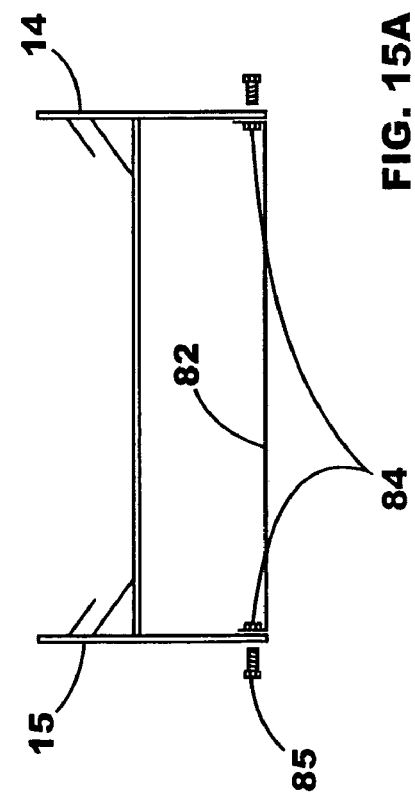
FIG. 15
FIG. 15A
FIG. 15B

INCLINE GRAIN CONVEYOR FOR GRAIN BINS

CROSS-REFERENCE TO RELATED APPLICATION

This application claims priority to U.S. Provisional Patent Applications Ser. No. 60/536,916 filed Jan. 16, 2004, and Ser. No. 60/547,947 filed Feb. 26, 2004, which are incorporated by reference herein in their entirety.

BACKGROUND OF THE INVENTION

A. Field of the Invention

The present invention relates to an apparatus and method of conveying grain from at or near the bottom of a grain bin, and particularly to such a method and apparatus which handles the grain more gently then conventional methods but efficiently withdraws grain from at or near the bottom of it to outside the bin for further use.

B. Problems in the Art

A variety of ways and structures have been devised to temporarily store grain or seed and selectively remove it from storage. One well-known method uses a circular sheet metal bin extending from a concrete slab generally at or near ground level. Typically, a metal floor is supported about a foot or so above the top of the slab. It can be perforated to allow passage of air but not the grain to be stored. A conical roof covers the cylindrical bin to protect it from the elements. Frequently there are vents added near the top of the bin and a fan added to the bottom of the bin. The fan draws air through the vent, and the bin, and the stored seed in the bin, and out the exhaust fan. This allows for aeration of the stored grain.

These bins can vary in size. Examples can be on the order of 20 feet in diameter and 20 feet tall, to several times that size. They represent a generally economical structure that can handle the weight and forces of a substantial quantity of grain (thousands of bushels) and both protect and allow it to be maintained in quality for further use and processing.

However, removal of grain from such a structure is not a trivial task. Competing interests are at stake. It is normally desirable to have an unloading system that has relatively high throughput to save unloading time. On the other hand, it is generally desirable that such a system be non-complex and relatively low cost. A conventional way of unloading such bins utilizes an auger placed laterally along the bottom of the bin between the slab and the metal floor. It extends outside the bin through an opening in the sidewall at or near the foundation slab. There sometimes is a channel or void in the slab in which the auger sits. Corn falls by gravity into the auger, usually through an opening in the metal floor. When removal is needed, the auger is simply operated. Normally the auger feeds the grain externally of the bin. Some other device then must be communicated with the outside end of the auger to lift it or otherwise convey it for further use.

Such a system is advantageous because it uses relatively simple mechanical devices and structures. It also utilizes gravity as the primary force to feed the grain to the auger. There may be manual labor involved to completely move all the grain from the bin (particularly once gravity no longer moves into the auger), but it avoids having some type of mechanism to move the grain vertically out of the bin.

However, certain deficiencies have been recognized with this type of system. For example, augers tend to grind or split at least some of kernels of grain. This not only can engender mechanical problems, e.g. jamming or degradation of the auger or structure around the auger, it can destroy or damage the grain. This is an increasingly important issue in today's agriculture. Plant science has evolved to develop varieties of seed or grain with special properties that are highly valued. However, the value can be dependent on the seed being intact and not materially damaged. One example is what is sometimes referred to as high oil grain. This is highly valued, for example, by food processors. However, the amount paid for the grain is dependent on its quality. Conveyance by augers tend to be detrimental on this point. Another example is what is called pharming or nutraceuticals. Genetic engineering is allowing pharmaceutically-active substances to be developed in growing seeds, including corn and soybeans. Once harvested, those active components are extracted by highly specialized processing. Again, the value of the grain is dependent on its quality. Damage in handling from harvest to processing must be minimized. Thus, the price for a grain crop can be highly dependent on amount of damage to it between harvesting and sale of the grain. In fact, many times grain will not even be accepted by a commercial buyer unless it meets certain minimum quality standards. On the other hand, a premium price will be paid for grain exceeding certain standards.

Therefore, a real need in the art has been identified for improving the quality of grain between storage and removal from a storage bin.

Secondly, state of the art augers are frequently required to be installed permanently at or in the concrete base of the bin. This not only adds to the cost of the bin when it originally constructed, but also dedicates that auger to that single bin. It cannot be selectively removed and used for other purposes, such as when unloading other bins.

Third, augers have inherent safety issues. Sufficient power must be imparted to the auger to move a substantial mass of grain. The auger flightings must conform closely to a housing. This configuration can grab or pull on clothing and is dangerous to the extremities of workers around it.

Therefore, auger unloading systems have further issues that have not been adequately addressed in the art.

Another type of current grain bin unloading methodology utilized vacuum. Negative pressure is generated at the end of a conduit outside the bin. A distal end of the conduit is inserted in the bin or at or near the bottom of the bin. Gravity can be used to move grain to that distal end and vacuum would convey it through the conduit to outside the bin. However, to attain high enough throughput, relatively high vacuum must be created. This takes significant energy and equipment, which makes them relatively expensive. Secondly, vacuum may cause some of the grain to impact along the interior of the conduit which could damage the grain and reduce its quality. Further, grain-to-grain impact while fluidized and moving in the conduit can also reduce quality.

Therefore, a real need for the improvement in the art of unloading grain bins has been identified.

One example of another type of grain bin unloading apparatus is shown at U.S. Pat. No. 5,088,871 to Mellish. Mellish shows a conveyor system having an elongated horizontal section and then an inclined section. The horizontal section is insertable into a concrete channel that extends across the diameter of a grain bin. A door is coincident with one end of the channel. This system is alleged to be useful to move horizontally out of the bin grain that is gravity-fed onto the top of the conveyor (see Mellish, FIG. 2). The inclined portion allows grain to be raised off ground level and dropped into another device for further conveyance. However, similar to an auger, the grain is exposed to moving metal that can damage it. Mellick uses exposed chains and metal angle iron cross pieces to pull the grain horizontally along a surface and then up the incline. This would also traumatize and/or damage grain, perhaps more so than an auger, and therefore would not solve the identified problems and deficiencies in the art.

SUMMARY OF INVENTION

It is therefore a principle object, feature, aspect or advantage of the present invention to provide an apparatus and method to improve upon or solve certain problems and deficiencies in the art. For example, some objects, features, aspects or advantages of the invention include an apparatus and method which:

a. provides relatively gentle handling of grain while removing it from inside a bin to outside a bin for further use;

b. is a relatively efficient conveying of grain from inside a bin to outside a bin over a range of rates, including a relatively a high rate at least on the order of current systems;

c. is a relatively economical system;

d. can be adapted to different grain bin sizes and configurations;

e. can be used for a variety of different unloading tasks;

f. can be built as original equipment or retrofitted into existing grain bins.

g. can be temporarily installed in one grain bin but removed and used in another grain bin or for other uses.

h. provides a durable, long-lasting system.

These and other objects, features, aspects, or advantages of the present invention will become more apparent with the reference to the accompanying specification and claims.

In one aspect of an apparatus according to the present invention, a conveyor for unloading grain or seed from at or near the bottom of the grain bin comprises an endless belt conveyor having a first end adapted for insertion into the interior of a grain bin and a second end adapted for extension out of the grain bin. A power source is connected to a driven roller outside the bin. One or more non-driven rollers are positioned at other places along the conveyor belt. Walls or surfaces enclose at least the conveying portion and opposite lateral sides of the conveyor belt to retain any seed that might move off the conveyor belt during operation. The arrangement is adapted to more gently handle grain from the bin to outside the bin but at a relatively high rate without spilling significant amounts of grain.

In another aspect of the invention, the endless conveyor belt unloading conveyor is made of multiple sections or stages. A first generally horizontal stage exists between the interior end and a mid section of the conveyor system. A second stage can be inclined relative to the first stage. The endless conveyor is supported between opposite ends of the multistage system but moves the grain first horizontally out of the bin and then at an incline such that the grain by gravity does not move backwards from the direction of movement of the conveyor belt. This would allow the outer inclined stage to lift the grain to make it easier to then off-load it, such as into another conveying system to convey it further.

In another aspect of the invention, the conveyor stages are adapted to fit different sized bins. The first horizontal section and second incline section have an intermediate section between them. The intermediate section can essentially be a module that can be inserted between the two opposite sections. It can have a variety of lengths for different diameters of bins. The conveyor belt can be easily adapted for the selected length of the conveyor.

In a further aspect of the invention, an endless belt grain bin unloader system comprises a frame having a solid underbed or pan upon the conveying or upper part of the conveyor belt is supported and ridesed, and side walls that contain either side of the that part of the conveyor belt and to retain any grain.

In a further aspect of the present invention, an endless conveyor belt grain bin unloading system has one or more sets of removable wheels that allow the conveyor to be moved from location to location. The wheels can be used to facilitate easier and quicker transport to a bin and insertion into a bin.

Another aspect of the invention comprises an endless conveyor belt grain bin unloader in combination with a grain well system. A movable gate or plate is configured in the grain well. The grain well can be installed over the interior portion of the conveyor between an opening in the floor supporting the grain and the conveyor. By a mechanism extending outside the grain bin, the plate can be moved to control the rate grain drops by gravity onto the top of the conveyor belt for the end of the conveyor inside the bin. The conveyor can then be operated to move grain outside the bin. The plate can be adjusted to increase or decrease rate of flow onto the conveyor belt. At a selected time, usually when a session of unloading is done, the control mechanism can be operated to slide the gate shut to stop grain from reaching the conveyor.

In a further aspect of the invention, an endless belt conveyor having an inside-the-bin-section and an outside-the-bin-section can have housings or cowls that are configured to essentially make the section outside the bin air tight, including its outlet and its interface with the grain bin. This would allow a pressurized aeration system of the grain bin to operate when not unloading grain from the bin.

BRIEF DESCRIPTION OF THE DRAWINGS

FIG. 1 is a perspective view of one exemplary embodiment of a belt conveyor according to one aspect of the present invention, showing internal rollers and the endless belt arrangement.

FIG. 2 is a partial side elevation of an exterior or inclined portion of the embodiment of FIG. 1.

FIG. 3 is a full side elevation of FIG. 1 including an inner or horizontal section of the conveyor.

FIG. 3A is an enlarged, isolated view showing, in partial sectional view, how certain of the rollers are attached to side walls of the conveyor.

FIG. 4 is a slightly enlarged, isolated, side elevation showing a section of the endless conveyor between the inner horizontal end and the inclined portion, including a conveyor belt tightening mechanism.

FIG. 4A is an enlarged view of the belt tightening mechanism of FIG. 4.

FIG. 5 is a sectional view of the top of the conveyor belt taken along line 5-5 of FIG. 4, further showing side rails that capture and guide opposite lateral edges of the conveyor belt to form a cup-shaped cross section to carry the grain.

FIG. 6 is similar to FIG. 1, showing in perspective a power source for moving the conveyor belt and other features of the conveyor FIG. 1.

FIG. 6A is an enlarged side elevation of a mounting method for the power source of FIG. 6 showing an adjustment method for a drive belt between the power source and the driven roller of the conveyor belt.

FIG. 7 is a partial assembled view of a portion of the horizontal portion of the conveyor of FIG. 1, illustrating a cross member or support pan for supporting the conveying section of the conveyor belt, and a method of building the horizontal section of the conveyor.

FIG. 8 is an enlarged section view taken along line 8-8 of FIG. 7.

FIG. 9 is from a similar perspective as FIG. 3, but shows wheel sets or carts for the conveyor of FIG. 1 that can be used to move conveyor from place to place and assist in installing it in a grain bin.

FIG. 9A is a bottom plan view of one set of wheels of FIG. 9.

FIG. 10 is a vertical sectional diagrammatical view of an exemplary grain bin with a conveyor according to FIG. 1 in place. Furthermore, it illustrates a complementary set of grain wells that can be selectively closed or opened to permit grain to fall on the conveyor by gravity from inside the bin.

FIG. 11 is an external elevation taken from the perspective of line 11-11 in FIG. 10 of an opening in the side of the grain bin and an insert adapted to be placed around a conveyor when installed through the opening to substantially seal the conveyor at this grain bin side wall interface.

FIG. 14A is a side elevation view of a modular embodiment of the conveyor of FIG. 1, showing an incline section, an inner-most part of the horizontal section, and an intermediate section that can determine the overall length of the horizontal section.

FIG. 14B is similar to FIG. 14A, but shows a longer intermediate section so that the conveyor assembly can be used with a bigger diameter grain bin.

FIG. 15 is similar to FIG. 1 but shows an additional aspect or option according to the invention, namely a removable bottom solid cover for the horizontal section of the conveyor.

FIG. 15A is a sectional view taken along line 15A-15A of FIG. 15.

FIG. 15B is an isolated side elevation of the removable cover of FIG. 15.

DETAILED DESCRIPTION OF EXEMPLARY EMBODIMENT

A. Overview

Figure 9C:
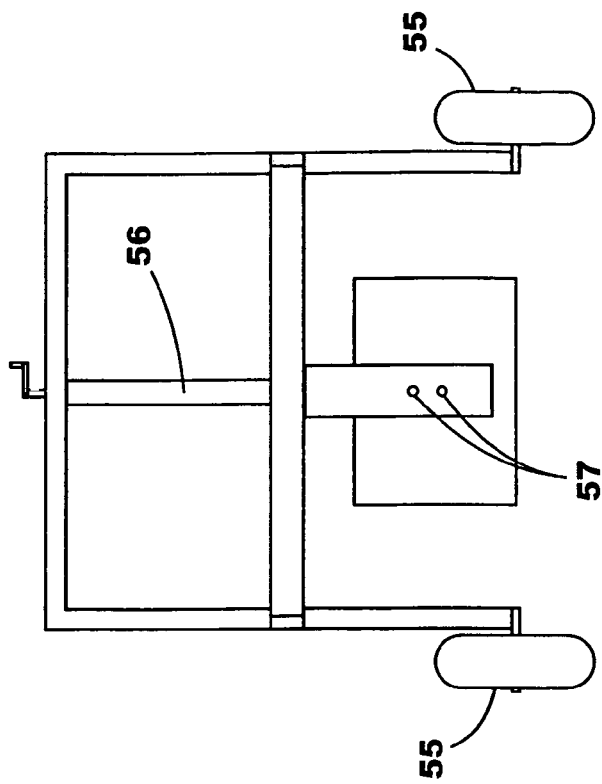
FIG. 9C is a partial elevation taken from the perspective of line 9C-9C of FIG. 9.

For better understanding of the invention, one example of a conveyor assembly according to the invention will now be described in detail. It is to be understood this is but one form the invention can take and is made by example and not by limitation.

Frequent reference will be taken to the above-described drawings. Reference numerals will be used to refer to certain parts and locations in the drawings. The same reference numerals will be used to indicate the same parts and locations throughout the drawings unless otherwise indicated.

B. Context of the Exemplary Embodiment

This embodiment will be described in the following context. It will be adapted for insertion at or near the concrete slab of a cylindrical corrugated metal grain bin. Particular, it will slide through the bin side wall between the horizontal steel bin floor and the top of the concrete slab. The grain bin will be adapted to hold agriculture seed (e.g., hybrid or genetically modified field corn seed). The concrete slab will have a generally flat upper surface. There will be a rectangular opening at the peripheral of one side of the bin.

The ground outside the bin will be relatively flat and an auxiliary conveyor device (any of a number of portable conveyors) can be moved underneath the outlet of the conveyor system of the exemplary embodiment of the invention. Such an auxiliary device is adapted to further elevate grain into a truck or trailer body or into another storage structure.

The exemplary embodiment is insertable where previously an auger system had been in the bin.

C. Main Components of Exemplary Embodiment

By referring to the drawings, the following main components of a conveyor assembly 10, according to one exemplary embodiment, can be seen. First, an endless conveyor belt 18 (somewhat flexible, two-ply material—outer side of rubber, inner side of nylon for low coefficient of friction) is supported on a plurality of rollers as indicated in FIGS. 1-4. The right side of these drawings show an elongated, flat (horizontal in operation) section of conveyor assembly 10. This portion will be placed substantially inside the bin and would extend to or slightly past the center of the interior of the bin.

A second section is inclined to the first section. It is generally enclosed around the corresponding part of conveyor belt 18 but leaves an opening or discharge directly underneath the very outer end of conveyor belt 18. Conveyor belt 18 would endlessly move around the rollers when operated. The portion of belt 18 above and between rollers 16 and 19 at any one time would thus be moving generally in a right-to-left direction in FIGS. 1-4 and anything carried on that upward-facing portion of belt 18 would fall by gravity off of the outer end and down through the open bottom of the housing around it. In this embodiment it would drop into a collection bin or a first end of a further conveying mechanism (not shown) and lifted, e.g., into a truck or trailer or wagon for transport.

It is to be understood that a substantial amount of the right-hand side of conveyor assembly 10 would be open on top to allow material to enter onto the top section of conveyor belt 18. However, the portion of conveyor assembly 10 that extends outside of the bin (see, e.g., FIG. 10) would be substantially enclosed, except for the bottom of the housing around the end of belt 18.

General dimensions of conveyor assembly 10 are as follows. Overall length is at least on the order of 289 inches. As would be described in more detail, the length can vary in what will be called a modular or multistage optional embodiment for conveyor 10. The horizontal section is approximately 10 inches high and 12.5 inches wide. It is approximately 220 inches long based on a 289 inch overall length. It therefore presents a relatively small profile that can be slid into the space beneath the support floor in most bins of this type. The incline section, at its outlet end, is approximately 13 inches high and 14.5 inches wide. The incline section overall length is approximately 56 inches from the intersection with the horizontal section on the top side of conveyor 10, and approximately 67 inches along the bottom. The horizontal part of the inclined section at the outer end of conveyor 10 is approximately 13.5 inches long. The top of the inclined portion is approximately 37 inches in height when placed on the ground. Conveyor 10 is particularly suited for use with bin foundations that are not more than 15 inches above the ground. Grain can be pulled from the bottom the bin horizontally almost along the ground, but the inclined section raises it sufficiently to allow another conveyance apparatus (e.g. a commercially available portable grain conveyor) to be rolled under the discharge end of the incline part of conveyor 10.

The overall shape and makeup of conveyor assembly 10 is therefore configured to receive grain from inside the bin by gravity, gently move it by cradling on top of conveyor belt 18 horizontally outside the bin through it removable door, and then up and incline and by gravity off the outlet end of belt 18. This general combination gently handles grain to better ensure high quality of grain as compared to augers and vacuums. It allows removal of grain with relatively low profile device into the grain bin. By selection of appropriate power source to move conveyor belt 18, it also can be operated at a speed that allows for relatively rapid removal; at least on the order of what a conventional auger could do (e.g. 3000 bushels per hour).

D. Construction Details

The following description will provide additional detail about conveyor assembly 10 and how it can be manufactured (particular reference should be taken to the various drawings referred to herein).

FIGS. 1-4 show a basic housing around conveyor belt 18 and how it is supported by properly spaced rollers mounted in that housing or frame. The housing or frame has essentially mirror image parallel side members 14 and 15 that extend the longitudinal length of conveyor assembly 10. They can be made of sheet metal (e.g. 1/8 inch thick).

A driven roller 16 (e.g. steel) is mounted by bolting a bearing and block assembly 17 on each side member 14 and 15. Driven roller 16 has an outer rubber covering glued for better frictional contact with belt 18. This deters slippage between roller 16 and belt 18. Slippage can reduce the life of belt 18. Another relatively large diameter but undriven roller 19 is at opposite end of conveyor assembly 10. Roller 19 has internal bearings so that all that is needed to mount the roller to sides 14 and 15 is two hard bolts (see FIG. 3A—a bolt would pass through an opening in sidewalls 14 and 15 respectively, and into internally threaded bores in the internal bearings at opposite ends of roller 19 to hold roller 19 in place. Roller 19 would rotate on the internal bearings).

An idler roller 20 is positioned next to driven roller 16. Roller 20 helps to wrap belt 18 to drive roller 16 for better traction. Roller 20 also has internal bearings.

As illustrated in FIG. 3, the incline section or head of conveyor assembly 10 is approximately 4 feet long and at an incline at about approximately 28 degrees (See Reference Numeral 21 in FIG. 3). The incline allows a space underneath the outlet end of conveyor assembly (See Reference Numeral 22 in FIG. 3) for a portable conveyor (not shown—commercially available and well known in the art) to raise the grain up to a wagon or truck box. A 28 degree incline is selected because anything materially greater may cause the grain to tumble backwards on the conveyor against its direction of movement.

Driven roller 16 is placed at the incline end of assembly 10 so that it and its power source are outside of the bin. This allows for easy access and maintenance.

As previously mentioned all of the inclined section is enclosed except for the small open area beneath the very end of belt 18 at drive roller 16. This virtually completely shields conveyor belt 18, all bearing blocks and turning shafts for safety purposes.

With particular reference to FIGS. 2, 3 and 4, what will be called an "S configuration 23" (See Reference Numeral 23 generally in FIG. 3) is formed for belt 18 at the position between the incline and horizontal sections of conveyor assembly 10. Rollers 24 and 25 have internal bearings and are mounted with bolts like rollers shown in FIG. 3A. Belt 18 goes around these two rollers 24 and 25 in the "S configuration" (when viewed from the side)

The S configuration allows a single, endless conveyor belt 18 to the used for the entire conveyor assembly 10—in particular for both the elongated horizontal section as well as the 28 degree incline section. Therefore one driven roller and one power source can be positioned at one end of the conveyor and operate the entire conveyor.

In this embodiment, belt 18 is a two-ply endless belt (not spliced). The outer side or ply is rubber to better hold the grain. The inner side or ply is nylon for a lower coefficient of friction over the rollers. The outer side of belt 18 can be textured or patterned to further assist in moving the grain along its conveying section.

Grain would drop by gravity from conveyor 18 after passing over roller 24 and then be picked up again by conveyor belt 18 and taken to the outlet end. But the S configuration also allows tension to be applied to the longitudinal direction of belt 18. As will be described further below, longitudinal adjustment of roller 14, for example, would allow belt 18 to be tightened or loosened, as desired.

Rollers 26 and 27 are smaller rollers with smaller bearings. They function to assist in bringing the bottom or returning part of belt 18 back and to ensure the return section misses the S configuration 23.

Rollers 28 and 29 are idler rollers with internal bearings. They hold up that returning portion of belt 18.

The diameter of the above mentioned rollers as follows:

| Roller ReferenceNumeral | Diameter |
|---|---|
| 16 | 4.5 inches |
| 20 | 2 inches |
| 24 | 4 inches |
| 25 | 4 inches |
| 26 | 2 inches |
| 27 | 2 inches |
| 28 | 2 inches |
| 19 | 4 inches |

All rollers are 12.5 inches long.

Opposite ends of top roller 24 on S configuration 23 can be fitted in and extend through a slot on opposite side walls 14 and 15 (See FIG. 4A). An adjustment bolt (threaded rod) can be attached to each threaded rod and extend longitudinally along each sidewall 14 and 15 away from the inclined end of conveyor 10. The threaded rods can extend through apertures in ears extending outwardly from side walls 14 and 15. Nuts on either side of each ear would allow roller 24 to be adjusted longitudinally towards or away from the inclined end of conveyor 12, and held in position. This allows relatively easy and non-complex adjustment of the tension of belt 18.

The adjustment of belt 18 tightness is also at a location easy to assess. Basically, both ends of roller 24 can be adjusted longitudinally of the direction of travel of belt 18, at least over the range allowed by the slots in side walls 14 and 15. By simply using a wrench and turning nuts on a threaded rod, the roller can be moved towards or away from the inclined end of conveyor 10, as needed.

Conveyor assembly 10 has a cross member or pan (e.g. sheet metal) upon which the a substantial part of the conveying section of conveyor 18 rides. By referring to FIGS. 1, 3, and 5, it can be seen that this pan extends between side walls 14 and 15 and directly beneath parts of belt 18. In particular, it extends between rollers 24 and 19 of the horizontal portion and between rollers 25 and 16 of the incline portion. This provides support for belt 18 and the weight it will carry. These pans 31 and 32 can be bolted to sides 14 and 15 (see, e.g., FIG. 7). As can be noted from the drawings, pans 31 and 32, in combination with the upper parts of side members 14 and 15 (which extend above the planer of the conveying portion of belt 18), serve as a three-sided enclosure around the top of belt 18. Thus, any seed that moves off of belt 18 would be captured and not lost or fall into other parts of assembly 18). Thus, conveyor belt 18 can easily slide over pans 31 and 32.

FIGS. 5, 7 and 8 show side rails 59. They are mounted against the interfacing side walls 14 and 15 and rest on grain pan 31 and pan 32. Rails 59 run the full length of conveyor 10. The purpose is to curve belt 18 and keep the grain from getting underneath belt 18. Rails 59 also act as a shield to protect the edges of belt 18 from rodents. FIG. 8 shows an end view of rails 59 with belt 18 going through. Part 60 is 1.5 inches and part 61 is 2.25 inches. They come together at a 42° angle (see FIG. 8). Part 62 is 1.75 inches and is parallel to part 61 with a 0.625 inch gap for the belt 18 to go between.

As shown in FIG. 7, conveyor 10 is put together with bolted construction. All pieces and holes can be cut with a metal laser. Side rails 59 and grain pan 31 are all bolted to conveyor sides 14, 15. The side pieces 14, 15 are bolted together using joining plates 63.

With particular reference to FIGS. 2 and 3, a curved piece of plastic 33 (e.g. ultra high molecular weight (UHMW) plastic) is installed inside the hood at the driven roller 16 end of conveyor belt 18. It can be bolted in from the top and front with round headed carriage bolts. Plastic 33 is approximately 0.1875 inch think and curves the grain downwardly as it comes off belt 18.

FIGS. 10-13 illustrate diagrammatically an optional grain well or chute that could be used with conveyor 10. Many grain bins would have an opening at the center of the supporting floor above the cement slab. FIGS. 10-13 illustrate a special grain well that could be added to the grain bin. It would fit onto conveyor 10 and allow adjustable opening and closing to control when grain could fall onto conveyor 10. It also could be controlled to, in turn, control the rate of grain falling onto conveyor 10.

There could be one or more such grain chutes in each bin. These bin chutes are designed to allow the grain to flow out of the bin onto conveyor belt 18. The width of the chute is narrower than the width of conveyor assembly 10 as it is designed to fit between side walls 14 and 15 of assembly 10. Chute 67 sits on bin floor 68 with conveyor positionable underneath. The sides of the chute have a lip 69 for the slide plate 70 to rest on.

Rod 71 is fastened to slide plate 70. Rod 71 extends to the outside of the bin. Rod 71 is used to pull open or push shut the slide plate 70.

Figure 12A:
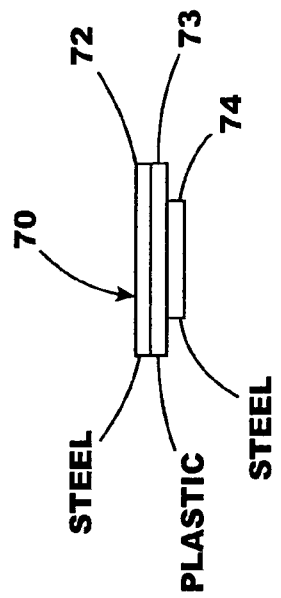
FIG. 12A is an end view of the slide plate above the conveyor.
Figure 12B:
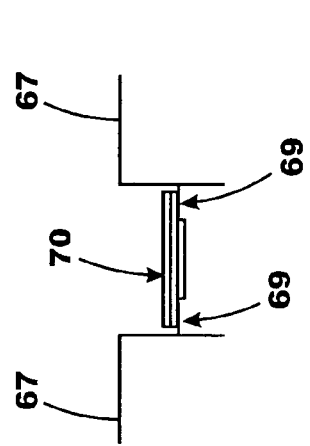
FIG. 12B is a diagrammatic sectional view of the slide plate and grain welldoor of FIG. 12A and supporting structure over the conveyor.
Figure 12:
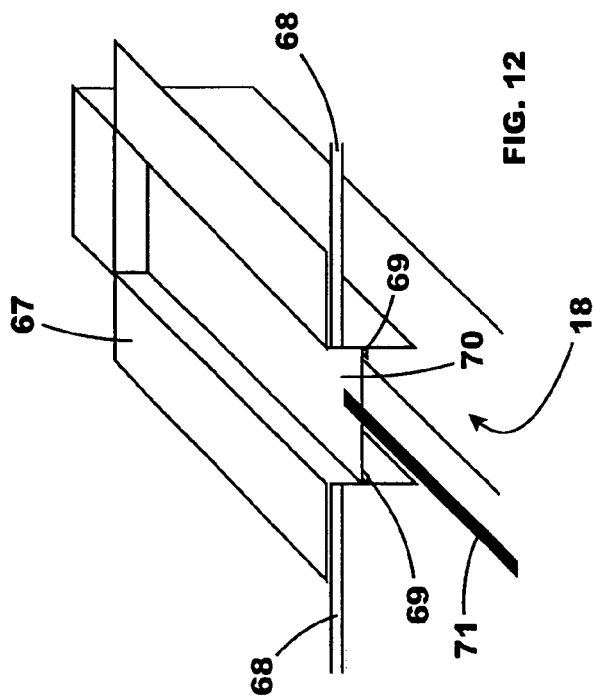
FIG. 12 is a perspective view of the exterior of the grain bin of FIG. 11 from above, showing a selectively openable and closeable slide plate above the conveyor according to FIG. 10.

Slide plate 70 is made of a flat piece of steel on top 72, piece of hard plastic (UHMW—⅛ inch thick) 73 of the same size underneath, and a piece of flat steel 74 a little smaller in width underneath. This multiple layer configuration (see the cross-section of FIG. 12A) is sandwiched together to make an integral slide plate. It can be bolted together or otherwise integrated. The exposed plastic of layer 73 would rest on the top of steel lips 69 and present a lower coefficient of friction to make it easier for plate 70 to slide. Prior art sliding gates usually had metal on metal or metal rolling on rollers. This sandwich design reduces friction and wear, and avoids the cost and maintenance problems of rollers.

FIG. 10 shows conveyor assembly 10 under bin 68. There could be multiple chutes 67 sitting on top of the conveyor or just a single opening. Connecting rod 71 could control either one slide plate 70 or there could be multiple sliding plates 70 and multiple control rods 71 and handles 75. If multiple grain wells, the sliding plate for each could be opened in any desired order. It may be preferable to open the grain well closest to side wall first, and allow grain to flow by gravity until it stops, open the next adjacent grain well, and so on. This would unload grain from one side of the bin to towards the center. This could allow a worker to enter the bin and stand on the floor to help unload the remainder or to install a center pivot sweeper auger.

In the exemplary embodiment, the entire width of the chute, including flanges 67, is approximately 24 inches wide and 29 inches in length. The sliding plate 70 is approximately 10 inches in width and 15 inches long. Flanges 69 upon which plate 70 slides are approximately 3 inches down from the level of support flanges 67.

Figure 13B:
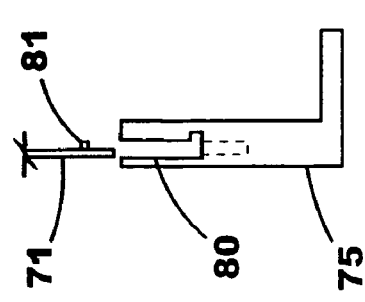
FIG. 13B is an enlarged view of a removable handle and control rod for selectively opening and closing the slide plate above the conveyor on the interior part of the grain bin.
Figure 13A:
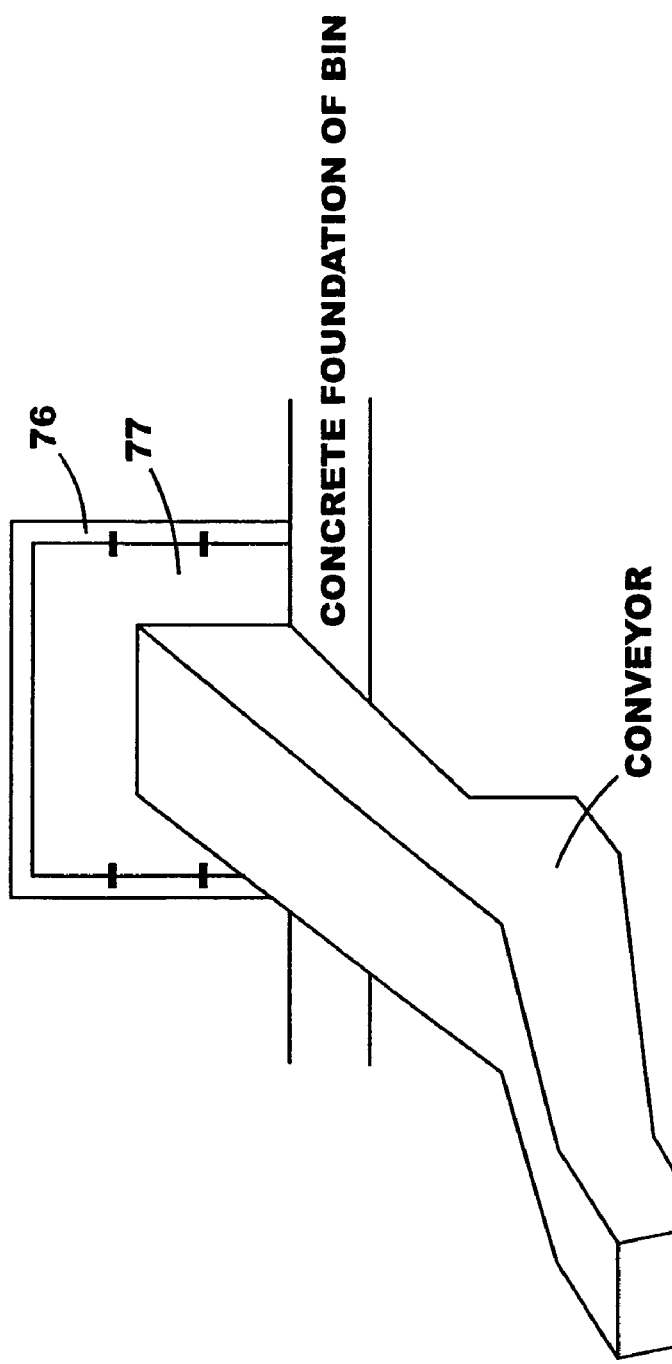
FIG. 13A is a perspective view of the exterior or inclined portion of the conveyor of FIG. 1 installed in a bin.

As illustrated in FIG. 13A, a handle 75 can be removable from rod 71 to allow it to be removed and stored, or removed and used with other rods 71. Here an L-shaped slot in the slid of handle 75 allows handle 75 to be axially mounted on the end of a rod 71 until roll pin 81 is aligned in the plane of branch of the L-shaped slot 80 that is perpendicular to the longitudinal axis of the handle. Slot 80 and pin 81 could be appropriately configured such that when handle 75 is mounted on rod 71, a one-quarter twist could lock roll pin 81 inside handle 75. By reversing handle 75 one-quarter turn, handle 75 can be removed from rod 71.

By positioning handle 75 external of the bin, it can be pushed inwardly towards the in to push a sliding plate 70 to close off any communication with the upper part of the bin. Conversely, the operator could pull handle 75 away from the bin to slide plate 70 horizontally from covering the opening of its grain well to create an opening between the top of conveyor belt 18 and what is immediately above it in the bin. Grain in the bin could then move by gravity onto the conveyor and unloading could commence by operation of the conveyor 18.

FIG. 13 shows another ancillary feature of this embodiment. There can be a removable door for a bin opening 76 at the base of the bin, or a rectangular opening can be cut or made to allow slideable insertion of conveyor 10. A U-shaped cover 77 can be placed around conveyor assembly 10 and fastened to bin opening 76. This U-shaped cover is needed especially when conveyor 10 is not being used so as to make the grain bin and conveyor system air tight. The aeration system on the grain bin therefore can then be operated effectively.

Figure 14C:
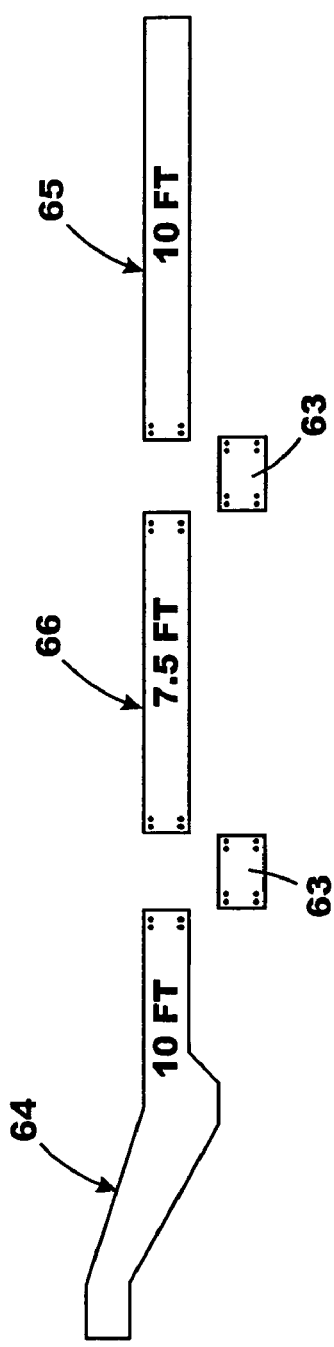
FIG. 14C is similar to FIG. 14B but shows a still further intermediate section for a still further bigger grain bin.
Figure 14D:
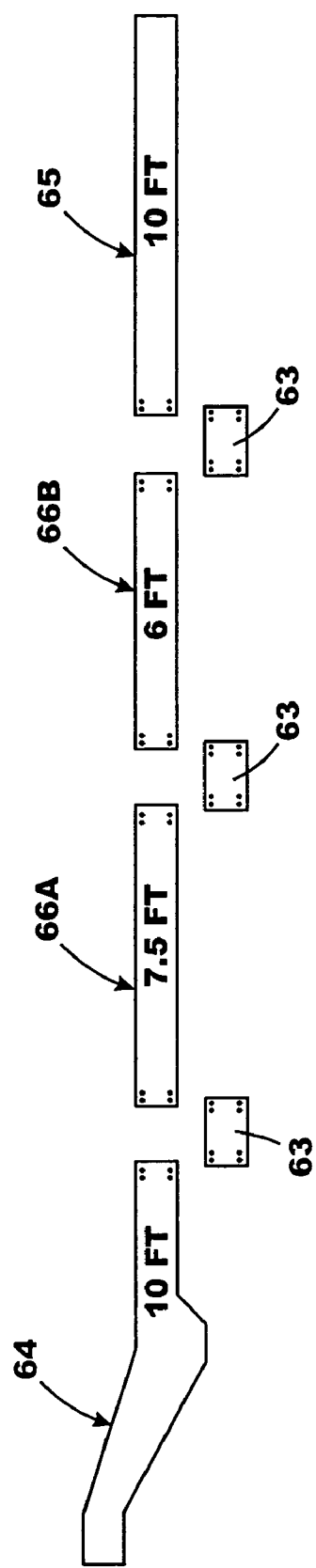
FIG. 14D is similar to FIG. 14C for an even bigger grain bin.

FIGS. 14A-D illustrate additional details about a modular feature. Interchangeable intermediate sections can be bolted between the incline section and the inner flat section by mounting plates 63 (bolted to either side of conveyor 10 through indicated bolt holes). The intermediate sections would be pre-assembled into a form similar to shown at FIG. 7; a flat pan section with opposite vertical side walls. As can be seen in FIG. 14A, a short intermediate section (1-foot length) would become part of the horizontal section of conveyor 10 to create the overall length for conveyor 10. FIGS. 14B-D show how different intermediate sections, whether longer single insertable sections, or combinations of a plural sections, to create longer overall conveyor lengths. Examples of some of the different conveyor length combinations are set forth below, with indicated motor horsepower for such lengths:

| FIG. | Overall Conveyor Length (feet) | Bin Diameter (feet) | Suggested motor (horsepower) |
|---|---|---|---|
| 4A | 21 feet 7 inches | 18-24 feet | 5-7.5 |
| 4B | 24' 7" | 27-30 | 7.5 |
| 4C | 28' 1" | 33-36 | 7.5 |
| 4D | 34' 1" | 42-48 | 7.5-10 |

In the system shown in FIGS. 14A-D, there are four different intermediate section lengths. This can accommodate at least nine different total conveyor lengths by using any of the four or combinations of any of the four.

A further ancillary part is illustrated in FIGS. 15A-C. A removable cover 82 can be placed along the bottom of at least the horizontal part of assembly 10 for safety reasons (no access to the belt from that side of assembly 10), and also for rodent protection. It is easily removably for clean out of dust and grain particles. Such covers 82 are flat sheet metal the width of the conveyor with bent up ears 83 every 24 inches. A nut 84 is welded on the back side of each ear 83 and thus a bolt 85 can be turned through sides 14 and 15 of assembly 10 onto each nut 84 on the ear 83 to hold it in place. It is therefore relatively easy, especially with power tools, to quickly remove it and replace it.

E. Options and Alternatives

It will be appreciated that the foregoing exemplary embodiment is for example only and not by way of limitation. The invention can take various embodiments and configurations. Variations obvious to those skilled in the art are also included within the invention. The claims define the scope of the invention, not any examples in this description.

For example, the precise dimensions and configuration of the invention can vary according to need and desire. The way in which parts are connected can be varied. The materials for the parts can vary. Additionally, variations in components and which components are used with assembly 10 can be selected. An electric motor 45 was described regarding assembly 10. It tends to be smaller, and thus more energy efficient and less expensive, than electric motors needed for other types of unloading systems, like augers. They can have a speed adjustment control. Other power sources are possible. For example, a hydraulic motor could be utilized (e.g. orbital with check valve and flow controller for adjusting speed).

Applications of the invention can include unloading of products from a bin other than seed corn. But a few examples include other agricultural seed such as wheat, soybeans, oats barley, peanuts, and popcorn. It may also be applicable to other products. It may be used for unloading or handling in contexts other than unloading a bin from its bottom.

An alternative embodiment for a conveyor according to the present invention is illustrated at FIGS. 16-19A. It is substantially similar to conveyor 10 of FIGS. 1-15 except for the following primary differences.

It has a relatively flat frame from inlet end to outlet end. The frame has a relatively low profile (8.5 inches) so that it can be placed under the aeration floor of a grain bin. This conveyor, referenced to generally at reference number 100, has a driven roller 121 at the outer end of conveyor frame and is powered either by an electric or hydraulic motor. About a foot back from the driven roller 121 is a belt tightening system at an easy-to-get-at location. A nondriven roller 122 is placed at the opposite end of a conveyor so a continuous belt 120 can be used. Like conveyor 10, belt 120 slides on a narrow pan on the top side of conveyor 100. Similarly, (not shown) side rails like side rails 59 are placed along the pan so belt 120 is cupped when running. On the bottom of the pan are several idler rollers (123, 124, 128, 129) to hold up belt 120.

Like conveyor 10, this belt conveyor 100 can be used to relatively gently handle product. Examples of grain or seed are corn, wheat, soybeans, oats, barley, and like products. Since conveyor 100 is generally flat going into the bin, it can be most advantageously used on higher foundations so that a portable conveyor or auger can be placed under the unloading head or outer end of conveyor 100. Many new, larger grain bins presently have higher bin foundations.

Figure 9B:
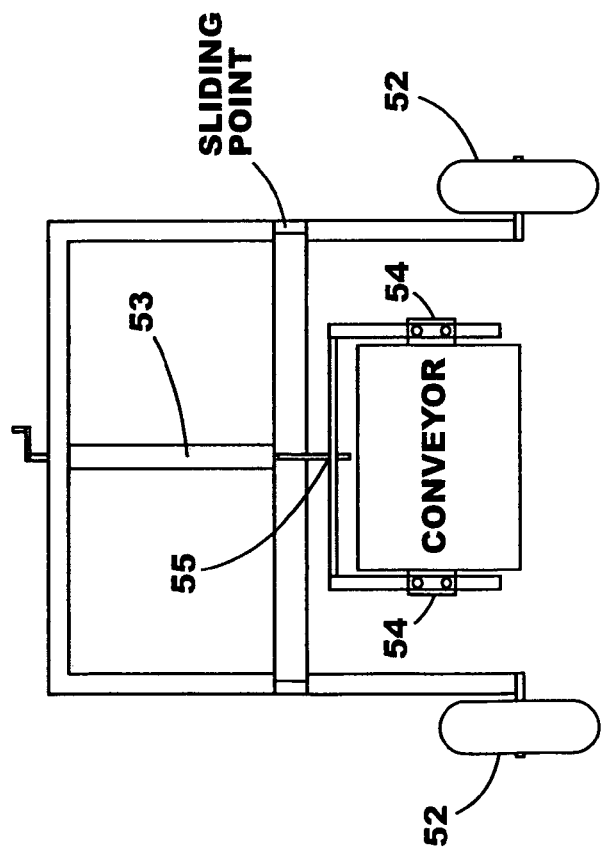
FIG. 9B is an elevation view taken from the perspective of line 9B-9B of FIG. 9.

Conveyor 100 can also utilize the wheel assemblies or carts such as described and shown in FIG. 9 for conveyor 10. In this embodiment, the capacity of belt 120 is significant for its size. It can deliver on the order of 5,000 to 5,500 bushels per hour (approximately a semi-tractor trailer load every 10-11 minutes). The quality of the grain coming from the bin is good, compared to grain augers. Like conveyor 10, conveyor 100 is therefore advantageous when raising grain for seed, grain for pharmaceuticals, and commercial grain, it has to meet certain standards for price premiums. Conveyor 100, like conveyor 10, is built for simple to use operation and maintenance, is relatively inexpensive, and can be sized with interchangeable intermediate sections for various sizes of grain bins.

Figure 16:
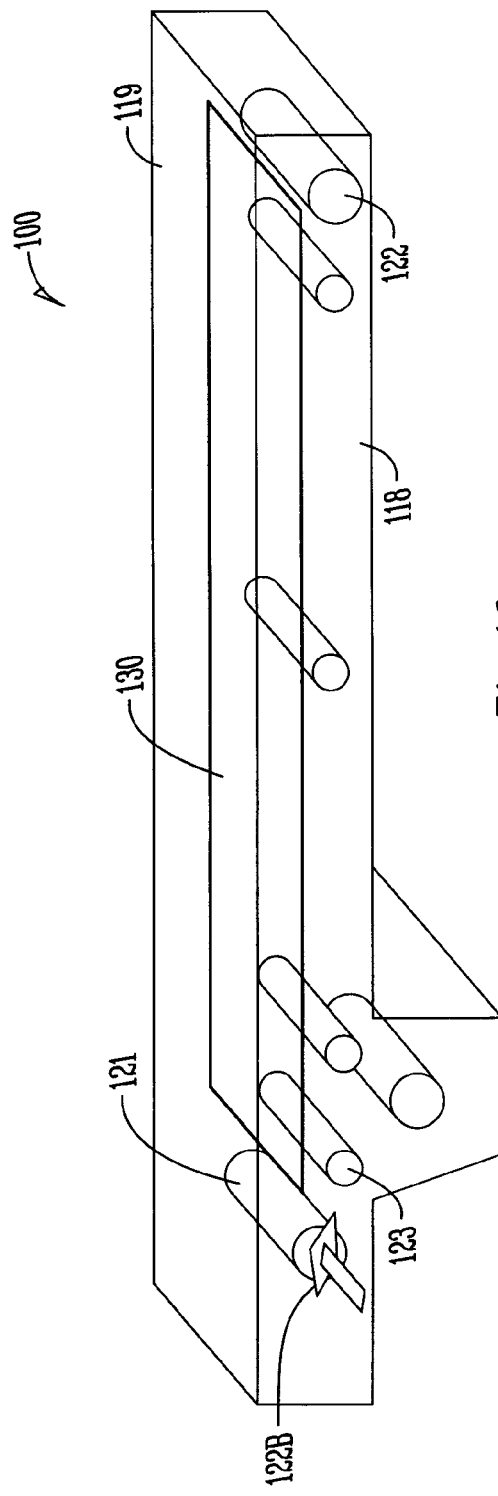
FIG. 16 is similar to FIG. 1 but shows an alternative embodiment according to the present invention.
Figure 17:
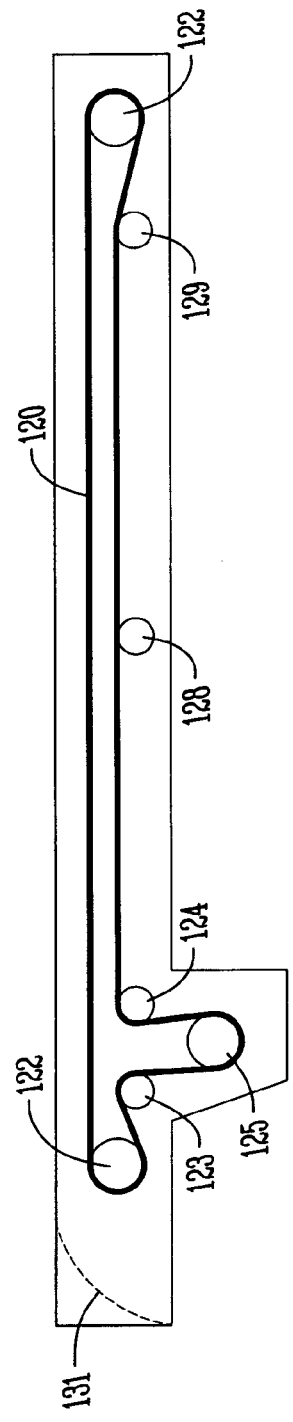
FIG. 17 is a side elevation of FIG. 16.

As shown in FIGS. 16 and 17, driven roller 121 is mounted by bolting on a bearing and block assembly 122 to side members 118 and 119 of conveyor 100. Drive roller 121 has a 1.25 inch center shaft for strength. Roller 121 has an outer rubber covering glued to the steel roller for better contact to belt 120. Roller 122 at the far end of conveyor 100 allows the belt to return. Roller 121 has internal bearings so that all that is needed to mount this roller between sides 118 and 119 are two hard bolts. See FIG. 19A. Idler roller 123 in FIG. 16 is close to driven roller 122. This idler roller helps to wrap belt 120 more on driven roller 122 for better traction. This roller 123 also has internal bearings.

Figure 18:
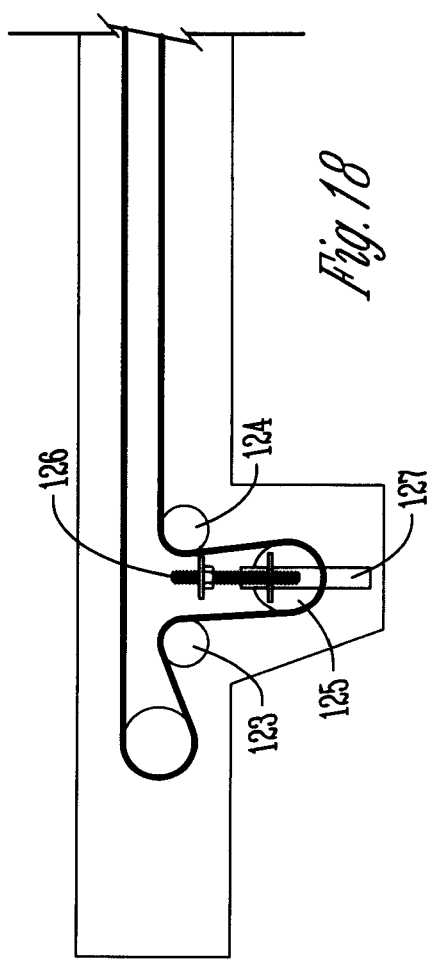
FIG. 18 is a slightly enlarged side elevation of the embodiment of FIG. 16 with a belt tightening adjustment mechanism.

FIG. 18 shows rollers 123, 124, and 125. They are all part of a belt tension adjustment device. Roller 125 moves up and down in slot 127 by means of an adjustment bolt 126. When the roller 125 is forced downward, it tightens belt 120. It is towards the outlet end of conveyor 100 for easy access. The three rollers 123, 124 and 125 all have internal bearings and are fastened to the side walls 118 and 119 with hard bolts. Rollers 128 and 129 are idler rollers with internal bearings.

The diameter of the rollers are as follows: roller 121—4.5 inches, roller 122—4.0 inches, roller 123—3.0 inches, roller 124—3.0 inches, roller 125—4.0 inches, roller 128—2.0 inches, roller 29—2.0 inches, all rollers are 12.25 inches long.

FIG. 16 shows grain pan 130 (belt 120 is not shown in this view) which is bolted to sides 118 and 119. Belt 120 runs on top of grain pan 130 and is supported by it.

FIG. 17 shows curved piece of plastic 131, the full width of conveyor 100. It is bolted in from the top and front with round headed carriage bolts. The plastic is about 0.1875 inch thick and curves the grain downward as it comes off the belt 120.

Figure 19:
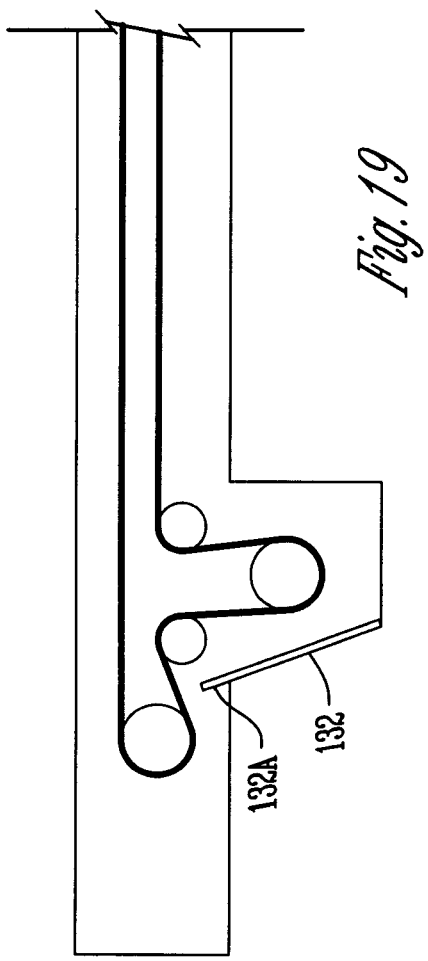
FIG. 19 is a similar view to FIG. 18 showing multiple roller configuration for the conveyor belt.
Figure 19A:
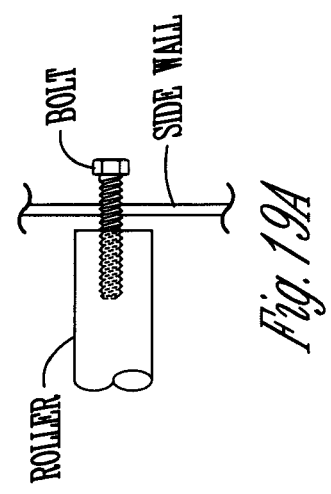
FIG. 19A is an enlarged sectional view of a fastening arrangement for some of the rollers of FIG. 16.

In FIG. 19, a component 132 is a front shield that goes up into the conveyor at 0.132A. A gap of 0.125 inch between this internal shield 132 and the conveyor belt 120 exists. This shield breaks the air current caused by belt 120 and keeps small particles of grain, fines, and dust from recirculating in the conveyor.

Conveyor 100 can have the other features shown with regard to conveyor 10 including but not limited to the adjustable motor drive, appropriate shielding, multi-stage or modular construction, side rails 59 to cup the conveyor belt 120.

It can be seen therefore that the above described exemplary embodiment achieves at least all of the enumerated objects of the present invention. It can easily be placed in a bin, has relatively high capacity, and deters harmful affect on quality of the grain or seeds. It uses relatively straight forward and noncomplex structure and functional features in a safe, simple to use and maintain, relatively inexpensive way that can be applied to a variety of bin sizes. It can be used to unload one bin, then moved to another, etc. Its size allows insertion under the floor of the bin.

What is claimed is:

1. An apparatus for unloading seed or grain from a grain bin having a foundation, a sidewall extending upwardly from the foundation, and a grain-supporting floor defining the bottom of a grain storage space, comprising:
   a. frame comprising a first and second stage;
   b. the first stage comprising an inlet section adapted for insertion generally horizontally and into a grain bin and an intermediate section connected to the inlet section;
   c. the second stage comprising an outlet section adapted for extension outside a grain bin from the intermediate section;
   d. at least the inlet section having a relatively low profile to allow it to be generally horizontally positionable below a grain supporting floor of a grain bin;
   e. a conveyor operatively positioned on the frame generally including and between the inlet and outlet sections adapted to receive grain through a grain supporting floor by gravity at the inlet section and, when operated, move grain to and drop it by gravity from the outlet section; and
   f. the conveyor comprising an endless conveyor belt having a conveying side and a return side;
   g. the conveyor along the inlet section and intermediate section being generally along a first plane and along the outlet section along generally a second plane that is at an obtuse angle to the first plane;
   h. the conveying side of the conveyor belt along the intermediate section extending a distance over the conveying side of the conveyor belt along the outlet section of the conveyor.

2. The apparatus of claim 1 wherein the obtuse angle is no greater than approximately 28 degrees.

3. The apparatus of claim 1 wherein the extension of the conveying side of the conveyor belt along the intermediate section over the conveying side of the conveyor belt along the outlet section is accomplished by wrapping the conveying side around a first non-driven roller to direct it back towards the inlet section a distance, and then wrapping it around a second non-driven roller underneath but offset towards the inlet section to produce an "S" configuration for that location of the conveying side of the conveyor belt.

4. The apparatus of claim 3 further comprising mounts for the first non-driven roller to the frame which allow adjustment of the first non-driven roller over a range generally along the longitudinal axis of the frame to adjust tension of the conveyor belt.

5. The apparatus of claim 1 wherein the grain supporting floor (a) is above a foundation, (b) includes an opening through grain can fall by gravity, and (c) is permeable to air.

6. The apparatus of claim 5 wherein the inlet section of the conveyor is supported by the foundation and the conveyor belt at the inlet section is underneath the opening in the grain supporting floor.

7. The apparatus of claim 6 wherein the opening in the grain supporting floor is at or near the center of the grain bin.

8. The apparatus of claim 5 wherein the grain supporting floor includes a plurality of openings through which grain can fall by gravity, the plurality of openings being aligned generally linearly.

9. The apparatus of claim 5 wherein the foundation is a concrete slab having a thickness and an upper surface.

10. The apparatus of claim 9 wherein the concrete slab further comprises a channel generally across the slab with a depth and a width.

11. The apparatus of claim 10 wherein the frame fits at least partially into the channel.

12. The apparatus of claim 1 wherein the conveyor belt has an outer grain conveying surface comprising rubber.

13. The apparatus of claim 1 further comprising a driven roller at the outlet section for driving the conveyor belt.

14. The apparatus of claim 13 further comprising a rotational power source operatively connected to the driven roller.

15. The apparatus of claim 1 further comprising a non-driven roller at the inlet section of the conveyor belt.

16. The apparatus of claim 1 further comprising a pan underneath at least a portion of the conveyor belt.

17. The apparatus of claim 16 further comprising side walls on opposite sides of at least some of the conveying side of the conveyor belt, the side walls extending above a plane defined by the conveying side of the conveyor belt.

18. The apparatus of claim 17 further comprising side rails along inner facing sides of the side walls, each side rail comprising a retaining guide which retains and guides an edge of the conveying side of the conveyor belt as it moves along the side walls.

19. The apparatus of claim 18 wherein the side rails retain and guide the edges of the conveyor belt at a higher level than the remainder of the conveyor belt to provide a cup shaped conveyor belt.

20. The apparatus of claim 19 further comprising an enclosure around substantially all of the outlet section of the apparatus.

21. The apparatus of claim 1 further comprising idler rollers at a plurality of positions under the return side of the conveyor belt.

22. An apparatus for unloading seed or grain from a grain bin having a foundation, a sidewall extending upwardly from a foundation, and a grain-supporting floor defining a bottom of a grain storage space, comprising:
   a. a frame comprising a first and second stage extending along a longitudinal axis;
   b. the first stage comprising an inlet section adapted for insertion generally horizontally and into a grain bin and an intermediate section connected to the inlet section;

c. the second stage comprising an outlet section adapted for extension outside a grain bin from the intermediate section;

d. at least the inlet section having a relatively low profile to allow it to be generally horizontally positionable below a grain supporting floor of a grain bin;

e. a conveyor operatively positioned on the frame generally between the inlet and outlet sections adapted to receive grain through a grain supporting floor by gravity at the inlet section and, when operated, move grain to and drop it by gravity from the outlet section; and f. the conveyor comprising an endless conveyor belt having a conveying side and a return side;

g. the intermediate section of the first stage being interchangeable to allow adaptation of the apparatus for different sizes of bins by selection of length of the intermediate section, the longitudinal axis of the frame through the inlet section and intermediate section being generally along a first plane and through the outlet section along a second plane that is at an obtuse angle to the first plane, the conveying side of the conveyor belt along the intermediate section extending a distance over the conveying side of the conveyor belt along the outlet section of the conveyor.

23. The apparatus of claim 22 wherein the apparatus is modular by comprising a fixed length outlet section, a fixed length inlet section, and a selectable length intermediate section.

24. The apparatus of claim 23 further comprising a set of different length intermediate sections to create a length for the apparatus by selection of one of the set of different lengths.

* * * * *

UNITED STATES PATENT AND TRADEMARK OFFICE
CERTIFICATE OF CORRECTION

PATENT NO. : 7,588,405 B2  Page 1 of 1
APPLICATION NO. : 11/035221
DATED : September 15, 2009
INVENTOR(S) : Johnson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 813 days.

Signed and Sealed this

Twenty-first Day of September, 2010

David J. Kappos
*Director of the United States Patent and Trademark Office*